United States Patent [19]

Latvys et al.

[11] Patent Number: 4,821,835

[45] Date of Patent: Apr. 18, 1989

[54] WHEEL SUSPENSION SENSING SYSTEM

[75] Inventors: Evaldas J. Latvys, Itasca; Ronald W. Barnhart, Elmhurst, both of Ill.

[73] Assignee: Economy Engineering Company, Bensenville, Ill.

[21] Appl. No.: 221,262

[22] Filed: Jul. 19, 1988

Related U.S. Application Data

[63] Continuation of Ser. No. 915,996, Oct. 6, 1986, abandoned.

[51] Int. Cl.⁴ .............................................. B60R 21/02
[52] U.S. Cl. .................................. 180/282; 187/9 R; 212/149
[58] Field of Search ......... 280/690, 698, 701, DIG. 1, 280/6 R; 180/41, 271, 282, 285, 283; 187/8.47, 9 R; 212/149

[56] References Cited

U.S. PATENT DOCUMENTS

| 2,921,160 | 1/1960 | Lautzenhiser | 280/DIG. 1 |
| 2,987,312 | 6/1961 | Alliquant | 280/DIG. 1 |
| 2,992,014 | 7/1961 | Muller | 280/DIG. 1 |
| 3,199,928 | 8/1965 | Chouings | 280/DIG. 1 |

FOREIGN PATENT DOCUMENTS 3212702 10/1983 Fed. Rep. of Germany ..... 280/6 R

Primary Examiner—David M. Mitchell
Assistant Examiner—Ross Weaver
Attorney, Agent, or Firm—Dressler, Goldsmith, Shore, Sutker & Milnamow, Ltd.

[57] ABSTRACT

There is provided a sensing system compatible with articulating axles whereby the angular difference between the axles is sensed by a limit switch. A spring loaded contact arm carried by one axle is used to trip a limit switch carried by the other axle.

11 Claims, 2 Drawing Sheets

WHEEL SUSPENSION SENSING SYSTEM

This application is a continuation of application Ser. No. 915,996, filed Oct. 6, 1986, now abandoned.

BACKGROUND OF THE INVENTION

The present invention relates generally to wheel suspension sensing systems for vehicles and particularly to those for use with strut-type suspensions for vehicles which allow a wheel to independently adapt to terrain.

Wheel suspension systems have been developed in the prior art to control the attitude of wheel axles in order to provide handling characteristics, affect steering, and soften the ride characteristics. In the art of mobile work platforms, vehicles are often driven across uneven terrain where it is desirable to maintain all wheels in contact with the ground at all times. Moreover, while the use of an articulating suspension system will maintain good contact, vechicle travel on uneven terrain with the platform elevated is hazardous but is not always avoided by operators. It is therefore a principal objective of the present invention to provide a system for sensing terrain and preventing vehicle travel with the platform elevated in such conditions.

SUMMARY OF THE INVENTION

Generally there is provided a system for disabling the power system of the vehicle when extreme movement of the articulating axle is sensed. The preferred embodiment of the present invention provides sensing means in the form of a limit switch positioned between a pair of articulating axles and arranged to be tripped when the angular differential between the axles exceeds the desired limits. This is accomplished by means of a spring loaded reciprocating arm affixed to one of the articulating axles and arranged to move therewith. On the other axle is provided a limit switch arranged to contact the reciprocating arm during a predetermined range of travel and to switch when contact with the arm is lost.

BRIEF DESCRIPTION OF THE DRAWINGS

Other objects and advantages of the invention will become apparent upon reading the following detailed description and upon reference to the drawings, in which.

While the invention will be described in connection with the preferred embodiment, it will be understood that we do not intend to limit the invention to that embodiment. On the ciontrary, we intend to cover all alternatives, modifications and equivalents as may be included within the spirit and scope of the invention as defined by the appended claims.

DESCRIPTION OF THE PREFERRED EMBODIMENT

Figure 1:
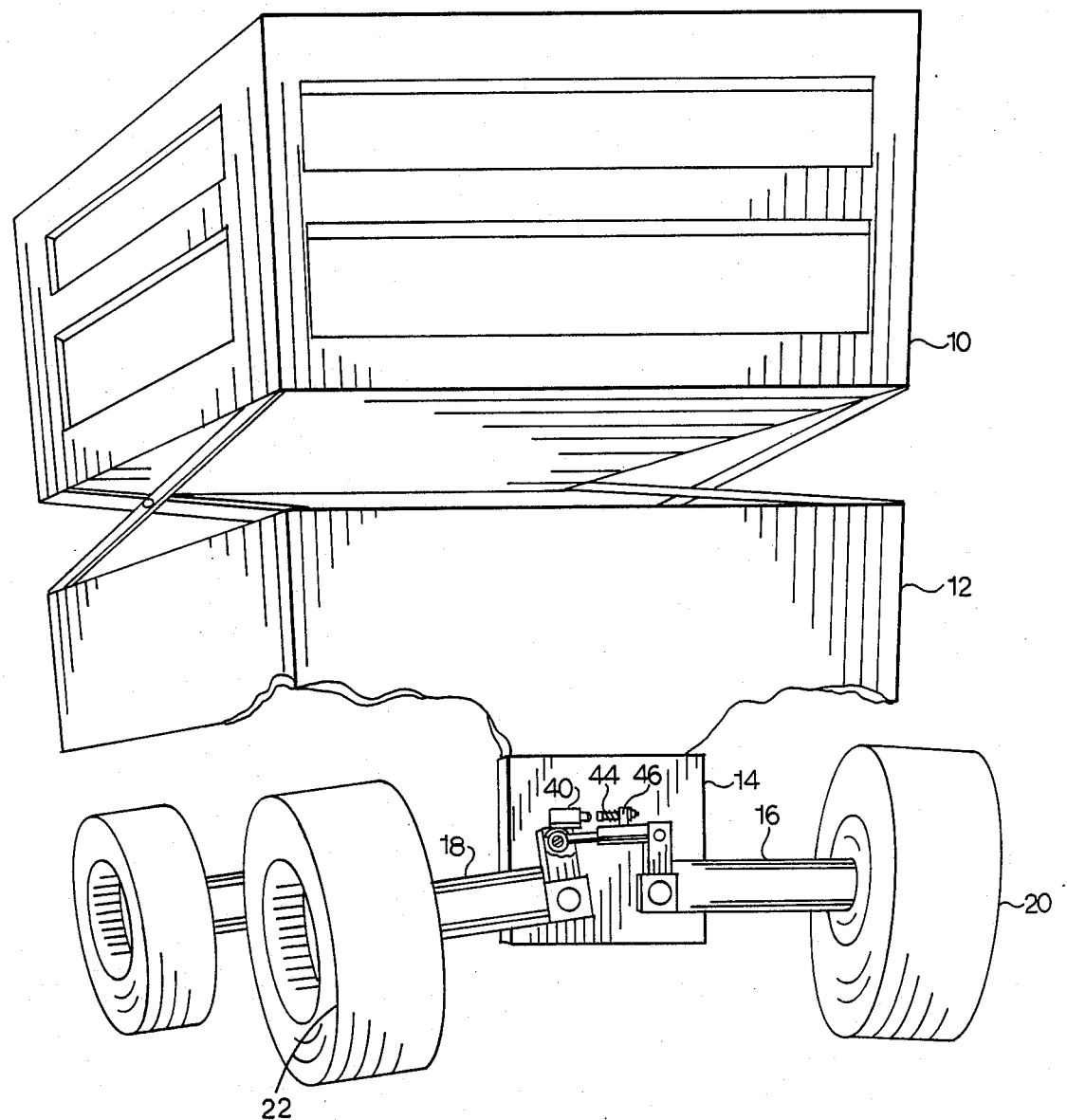
FIG. 1 is a pictorial view of a work platform vehicle showing the suspension sensing system of the present invention.

Turning to FIG. 1 there is shown a pictorial view of a lift platform vehicle having an elevated platform 10 and a chassis 12. Secured to a mounting 14 on the underside f the chassis there are provided wheel support members 16 and 18. Each may be spindle mounted non-drive wheels or may have mounted thereon a fluidically driven wheel motor and wheel 20 and 22.

Figure 2:
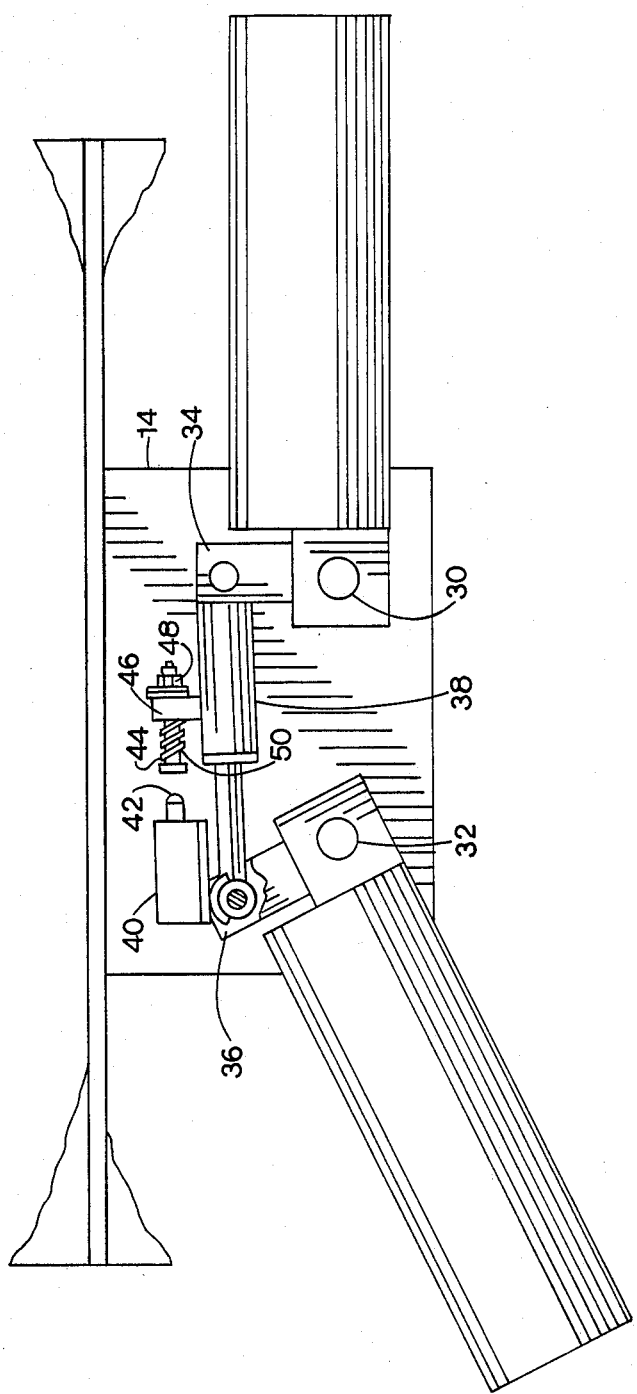
FIG. 2 is a front elevational view of the suspension sensing system of FIG. 1.

As most clearly depicted in FIG. 2, the wheel support members are pivotally mounted to the chassis via the mounting plate 14 at their respective pivotal attachments 30 and 32. Protruding from the wheel support members proximate their pivotal attachment are position control levers 34 and 36 arranged to control the position of the wheel support members about their pivotal mountings. Arranged to actuate these control levers there is provided a hydraulic cylinder 38 pivotally connected between the control levers.

Sensing of the relative position of the control levers is provided by a limit switch 40 affixed to one control lever to move therewith. Protruding from this switch toward the opposing control lever is a button 42 for making or breaking electrical contact within the switch. Mounted on the hydraulic cylinder there is provided a protruding contact arm 44 arranged to reciprocate within its mounting sleeve 46. At one extremity there is provided a stopper 48 arranged to hold the arm within the mounting sleeve. In the preferred embodiment, the contact arm is a threaded shaft and the stopper mechanism comprises a threaded nut which provides adjustment of the length of the arm. At the opposite protruding end there is provided a contact surface arranged to strike the switch button. This contact arm is held extended by force of a coil spring 50 which maintains the arm contact surface against the switch button until the angular difference between the axles exceeds a predetermined amount. At that position, the contact arm 44 will no longer reach to depress the switch button, causing the switch to sense the condition of the axles.

The electrical signal from the limit switch may be used to trigger solenoids to shut off power to the vehicle systems such as the drive circuits or the lift circuit. Where these circuits are fluid powered, solenoids may be used to actuate valves to block or bypass the drive or lift circuits.

In summary, there has been shown and described a sensing system compatible with articulating axles whereby the angular difference between the axles is sensed by a limit switch. A spring loaded contact arm carried by one axle is used to trip a limit switch carried by the other axle.

We claim:

1. A wheel suspension sensing system for a vehicle having a chassis, a first axle assembly including first and second wheel support members pivotally mounted to said chassis for mounting a first pair of wheels on said chassis and a second axle assembly mounted to said chassis for mounting a second pair of wheels on said chassis, at least one pair of said wheels constituting drive wheels for driving said vehicle, said sensing system comprising:

an electrical limit switch affixed to said first wheel support member and arranged to move therewith, said limit switch having a trip button arranged to extend toward said second wheel support member; and a position sensing arm mounted to said second wheel support member for reciprocal motion and arranged to protrude toward said limit switch, and further comprising means urging said position sensing arm toward its full extension, whereby said position sensing arm maintains contact with said limit switch trip button during a first range of angular difference between said wheel support members but loses contact during a second range of angular difference so that a first electrical signal is caused during said first range of angular separation permitting said vehicle to be moved by said drive wheels and a second electrical signal is caused during said second range of angular separation, said second signal preventing said drive wheels from driving said vehicle.

2. A wheel suspension sensing system for a driven vehicle supported on a pair of wheeled axle assemblies and having at least one pair of driven wheels, one axle assembly including first and second articulated axles extending in opposite directions from each other and each of which has a wheel at one end thereof, said sensing system comprising:

an electrical limit switch affixed to the first of the axles and having an actuating button presented toward the second axle; and a position sensing arm mounted for distendable movement on said second axle to maintain contact with said limit switch during a first range of angular separation of said axles and to break contact with said limit switch during a second range of angular separation of said axles so that a first electrical signal is caused during said first range of angular separation permitting said vehicle to be driven and a second electrical signal is caused during said second range of angular separation, said second signal preventing said one pair of wheels from driving said vehicle.

3. The wheel suspensing sensing system of claim 2 wherein said sensing arm includes means for urging said position sensing arm toward a fully distended position.

4. The wheel suspension sensing system of claim 2 wherein the full distended length of said position sensing arm is adjustable.

5. The wheel suspension sensing system of claim 3 wherein said position sensing arm is comprised of a threaded shaft having a threaded nut on one end thereof for adjusting the effective length thereof, and further comprising a coil spring member coaxially disposed on said shaft and arranged to urge said shaft toward said limit switch.

6. A wheel suspension sensing system for a vehicle including a platform which is movable to an elevated position, a first axle assembly including a pair f axles extending in opposite directions from each other and pivotally attached to a frame of the vehicle, said pair of axles mounting a first pair of ground engaging wheels on the frame for independent, but substantially co-planar, pivotal movement relative to the frame, a second axle assembly attached to said frame and including a second pair of ground engaging wheels, at least one pair of ground engaging wheels constituting drive wheels for driving said vehicle, said sensing system comprising:

means for sensing the angular disposition of one of said axles of said first axle assembly relative to the disposition of the other axle of said first axle assembly within a predetermined range of relative angular separation, said sensing means including a switch carried by one of said axles and capable of producing different signals as a function of its operative state, and a distendable position sensing arm carried by the other axle for maintaining said switch in one operative state during a predetermined range of relative angular separation between said axles allowing said vehicle to be driven with said platform in an elevated position and causing said switch to change its operative state when said predetermined range of relative angular separation between said axles is exceeded, said change in the operative state of said switch preventing said drive wheels from driving said vehicle.

7. A wheel suspension sensing system according to claim 6 wherein said switch includes an actuator extending toward said sensing arm, and said sensing arm is carried by said other axle in a manner allowing axial displacement thereof and is resiliently biased toward said actuator.

8. A wheel suspension sensing system according to claim 7 wherein the length of said sensing arm can be adjusted to affect the range of relative angular separation allowed between said axles before said switch changes state.

9. A wheel suspension sensing sytem according to claim 8 wherein said sensing arm comprises a threaded shaft extending from said other axle and having a threaded fastener thereon for adjusting its effective length, and a spring co-axially arranged on said shaft for urging said shaft toward said switch.

10. A wheel suspension system for a vehicle having a chassis, first and second wheel support members pivotally mounted to said chassis independently of each other, with each support member having a ground engaging wheel rotatably mounted thereon to define a first pair f wheels, a second pair of wheels mounted on said chassis, with at least one pair of wheels constituting drive wheels for moving said vehicle, said sensing system comprising:

means for monitoring the pivotal position of one wheel support member relative to the pivotal position of the other wheel support member said monitoring means including an electric limit switch carried by one of said wheel support members and capable of producing different outputs as a function of its operative state, and a distendable position sensing arm carried by the other wheel support member for maintaining said limit switch in one operative state during a predetermined range of relative angular separation between said wheel support members permitting said vehicle to be moved by said drive wheels and to cause said limit switch to change its operative state when said predetermined range of relative angular separation between said wheel support member is exceeded, said change of state of said limit switch preventing said ground engaging wheels from moving said vehicle.

11. A wheel suspension sensing system for a platform vehicle which operates with a platform in an elevated position, a first axle assembly including a first pair of ground engaging wheels mounted on a pair of axles attached to a frame for independent pivotal movement relative to the frame, each axle extending in opposite directions from its pivotal attachment to the frame, a second axle assembly attached to said frame and including a second pair of ground engaging wheels, at least one pair of ground engaging wheels constituting drive wheels for moving said vehicle, said sensing system comprising:

means for sensing the angular disposition of one axle of said first axle assembly relative to the disposition of the other axle of said first axle assembly within a predetermined range of angular separation, said sensing means including a switch carried by one of said axles for producing different signals as a function of its operative state, and a distendable position sensing arm carried by the other axle for maintaining said switch in one operative state during a predetermined range of relative angular separation between said axles to allow said vehicle to be operated with said platform in an elevated position and to cause said switch to change its operative state when said predetermined range of angular separation between said axles is exceeded, said change in the operative state of said switch preventing operation of said vehicle with said platform in an elevated position.

* * * * *

UNITED STATES PATENT AND TRADEMARK OFFICE
CERTIFICATE OF CORRECTION

PATENT NO. : 4,821,835

DATED : April 18, 1989

INVENTOR(S) : E. J. Latvys; R. W. Barnhart

It is certified that error appears in the above-identified patent and that said Letters Patent is hereby corrected as shown below:

Column 1, line 20, "vechicle" should be --vehicle--;
Column 1, line 55, "ciontrary" should be --contrary--;
Column 1, line 65, "f" should be --of--;
Column 3, line 29, "suspensing" should be --suspension--;
Column 3, line 44, "f" should be --of--;
Column 4, line 15, "sytem" should be --system--; and
Column 4, line 26, "f" should be --of--.

Signed and Sealed this

Twenty-third Day of January, 1990

Attest:

JEFFREY M. SAMUELS

*Attesting Officer*  *Acting Commissioner of Patents and Trademarks*